United States Patent
Hong

(10) Patent No.: US 7,184,114 B2
(45) Date of Patent: Feb. 27, 2007

(54) TRANSFLECTIVE TYPE LIQUID CRYSTAL DISPLAY DEVICE AND METHOD FOR MANUFACTURING THE SAME

(75) Inventor: Soon Kwang Hong, Daegu-si (KR)

(73) Assignee: LG. Philips LCD Co., Ltd., Seoul (KR)

( * ) Notice: Subject to any disclaimer, the term of this patent is extended or adjusted under 35 U.S.C. 154(b) by 223 days.

(21) Appl. No.: 10/973,462

(22) Filed: Oct. 27, 2004

(65) Prior Publication Data
US 2005/0140873 A1    Jun. 30, 2005

(30) Foreign Application Priority Data
Dec. 30, 2003    (KR) ............... 10-2003-0100688

(51) Int. Cl.
*G02F 1/1335*    (2006.01)
(52) U.S. Cl. ............... 349/114; 349/106; 349/113; 349/62; 349/65; 359/618; 359/620
(58) Field of Classification Search ........... 349/62–65, 349/106, 113, 114; 359/618, 620
See application file for complete search history.

(56) References Cited
U.S. PATENT DOCUMENTS
5,929,962 A * 7/1999 Chiu et al. ............... 349/187

6,894,840 B2 * 5/2005 Yamanaka et al. ........... 359/619
2002/0036730 A1    3/2002 Baek et al.
2002/0149717 A1 * 10/2002 Borrelli et al. ............... 349/95

FOREIGN PATENT DOCUMENTS
WO    WO 02/077678    10/2002

* cited by examiner

*Primary Examiner*—Huyen Ngo
(74) *Attorney, Agent, or Firm*—Morgan, Lewis & Bockius LLP

(57) ABSTRACT

A transflective type liquid crystal display device includes a first substrate having a pixel region, the pixel region including a transmission region and a reflection region that has a reflector formed thereon; a second substrate, which faces the first substrate, and on which a light guiding layer and a color filter layer are formed, the light guiding layer including a first medium and a second medium, a refractive index of the first medium and a refractive index of the second medium being different from each other; a liquid crystal layer interposed between the first and the second substrates; and a backlight assembly positioned outside of the first substrate to provide light onto the first medium in a reflection mode.

12 Claims, 8 Drawing Sheets

TRANSFLECTIVE TYPE LIQUID CRYSTAL DISPLAY DEVICE AND METHOD FOR MANUFACTURING THE SAME

The present invention claims the benefit of Korean Patent Application No. 10-2003-100688 filed in Korea on Dec. 30, 2003, which is hereby incorporated by reference.

BACKGROUND OF THE INVENTION

1. Field of the Invention

The present invention relates to a liquid crystal display (LCD) device, and more particularly to a transflective type liquid crystal display device and method for manufacturing the same.

2. Description of the Related Art

Generally, liquid crystal display (LCD) devices are widely used for portable computers, office automation machines, and audio/video apparatuses because they are lightweight, thin, and consume low power. An LCD device includes two substrates and a liquid crystal layer interposed between the two substrates. The LCD device uses ambient light or a backlight assembly to generate light. The LCD device displays an image by controlling light transmission through the liquid crystal layer using an applied electric field to change an orientation of liquid crystal molecules. Generally, LCD devices can be classified into two categories: transmission type LCD devices and reflection type LCD devices.

FIG. 1 is a cross-sectional view of a transmission type LCD device according to a related art. Referring to FIG. 1, the transmission type LCD device includes a first substrate 102, and a second substrate 101 facing the first substrate 102.

A plurality of thin film transistors (TFTs) functioning as switching elements are formed on the first substrate 102 adjacent to crossings of gate lines and data lines. A black matrix (BM) layer, a color filter layer, and a common electrode are formed on the second substrate 101. A liquid crystal layer 103 including liquid crystals is interposed between the first and the second substrates 102 and 101. A first polarizing plate 105 and a second polarizing plate 104 are arranged on an outer surface of each of the first and the second substrates 102 and 101. An optical transmission axis of the first polarizing plate 105 has an angle of 90° relative to that of the second polarizing plate 104. A backlight assembly 106 is disposed outside the first polarizing plate 105. The backlight assembly 106 generates light and directs the generated light toward the first substrate 102.

In the related art LCD device, when the TFTs are turned on by a scanning signal applied to a plurality of gate lines, and data signals are applied to a plurality of data lines, the data signals are applied to pixel electrodes through the turned-on TFTs. A common voltage is supplied to the common electrode of the second substrate 101. Accordingly, the liquid crystals are controlled by the electric field generated between the pixel electrodes and the common electrode to transmit or block light provided from the backlight assembly 106, thus displaying a predetermined image.

The volume of the related art transmission type LCD device is large, which increases the thickness of the LCD device. Also, the backlight assembly 106 is heavy, thus increasing the thickness of the LCD device. Moreover, a power consumption of the backlight assembly 106 is excessively high.

To address these problems, a reflection type LCD device has been introduced. The reflection type LCD device uses ambient light in place of the backlight assembly 106. Such a reflection type LCD device has low power consumption. Consequently, the reflection type LCD device is widely used in portable display devices, such as electronic organizers and PDA (Personal Digital Assistant).

FIG. 2 is a cross-sectional view of a reflection type LCD device according to a related art. Referring to FIG. 2, the reflection type LCD device includes a first substrate 202 and a second substrate 201 facing the first substrate 202. A plurality of thin film transistors (TFTs) functioning as switching elements are formed on the first substrate 202 adjacent to crossings of gate lines and data lines. A black matrix (BM) layer, a color filter layer, and a common electrode are formed on the second substrate 201. A liquid crystal layer 203 including liquid crystals is interposed between the first and the second substrates 202 and 201. A first and a second polarizing plates 205 and 204 are arranged on an outer surface of each of the first and the second substrates 202 and 201. An optical transmission axis of the first polarizing plate 205 has an angle of 90° relative to that of the second polarizing plate 204. A reflector 206 is disposed outside the first polarizing plate 205. The reflector 206 reflects light provided from the ambient light of an outside and provides the same toward the first substrate 202.

In the LCD device having the foregoing structure, when a plurality of TFTs are turned on by scanning signals applied to a plurality of gate lines, and data signals are applied to a plurality of data lines, the data signals are applied to pixel electrodes through the turned-on TFTs. A common voltage is supplied to the common electrode of the second substrate 201. Accordingly, the liquid crystals are controlled by the electric field generated between the pixel electrodes and the common electrode to transmit or block ambient light reflected by the reflector 206, thereby displaying a predetermined image.

In the related art reflection type LCD device, when the intensity of ambient light is insufficient (for example, in dim light), the brightness level of the displayed image is low, and the displayed information is not readable. To resolve the above problems, a transflective type LCD device, which combines advantages of reflection type LCD devices and the transmission type LCD devices, has been proposed.

FIG. 3 is a cross-sectional view of a transflective type LCD device according to a related art. Referring to FIG. 3, the transflective type LCD device includes, a first substrate 330 and a second substrate 310, which faces the first substrate 330. A plurality of thin film transistors (TFTs) functioning as switching elements are formed on the first substrate 330 at crossing of gate lines and data lines. A black matrix (BM) layer, a color filter layer, and a common electrode are formed on the second substrate 310. A liquid crystal layer 320 including liquid crystals is interposed between the first and the second substrates 330 and 310. A first and a second polarizing plates 331 and 311 are arranged on a lower surface of the first substrate 330 and an upper surface of the second substrates 310, respectively. An optical transmission axis of the first polarizing plate 331 has an angle of 90° relative to that of the second polarizing plate 311. A backlight assembly 340 is disposed outside the first polarizing plate 331.

A plurality of pixel electrodes are formed on the first substrate 330, each connected to one of a plurality of TFTs. A passivation layer 322 and a reflector 323 are sequentially formed on the pixel electrodes. The passivation layer 322 includes a transmission hole 321, which exposes a portion (transmission region) of each of the pixel electrodes.

The region corresponding to the reflector 323 is a reflection region 'r'. The region corresponding to the exposed portion of the pixel electrode is a transmission region 't'. The reflection region 'r' is the region within which incident ambient light is reflected in a reflection mode. The transmission region 't' is the region through which light emitted from the backlight assembly 340 propagates in a transmission mode. A cell gap d1 of the transmission region 't' is about twice as large as a cell gap d2 of the reflection region 'r' to reduce a difference in a light propagation distance between the transmission region 't' and the reflection region 'r'. Generally, a phase difference δ of a liquid crystal is obtained by the following formula:

$$\delta = \Delta n \cdot d$$

In the above equation, δ represents a phase difference of a liquid crystal, Δn is a refractive index of a liquid crystal, and d represents a cell gap. Thus, there is a difference in optical efficiency between the reflection mode, which uses light reflection, and the transmission mode, which uses light transmission. To reduce the difference in optical efficiency, the cell gap d1 of the transmission region 't' should be greater than the cell gap d2 of the reflection region 'r' such that the phase difference value of the liquid crystal layer 320 is maintained constant.

Even though the difference in optical efficiency is reduced by making the cell gap d1 of the transmission region 't' different from the cell gap d2 of the reflection region 'r', if the transmission region and the reflection region are not optimized, it is difficult to obtain optimized optical efficiency. For example, in the transmission mode, all of the light provided from the backlight assembly does not go through the transmission region. Part of the light emitted from the backlight assembly propagates within the reflection region and is not transmitted, thereby causing optical loss. Also, in the reflection mode, ambient light is not all reflected by the reflector. Instead, part of the ambient light propagates toward the backlight assembly through the transmission region, thereby causing optical loss.

SUMMARY OF THE INVENTION

Accordingly, the present invention is directed to a transflective type liquid crystal display device and a method for manufacturing the same that substantially obviate one or more of problems due to limitations and disadvantages of the related art.

An object of the present invention is to provide a transflective type liquid crystal display device having a maximum optical efficiency.

Another object of the present invention is to provide a method for manufacturing a transflective type liquid crystal device having a maximum optical efficiency.

Additional features and advantages of the invention will be set forth in the description which follows and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the transflective type liquid crystal display device includes a first substrate having a pixel region, the pixel region including a transmission region and a reflection region that has a reflector formed thereon; a second substrate, which faces the first substrate, and on which a light guiding layer and a color filter layer are formed, the light guiding layer including a first medium and a second medium, a refractive index of the first medium and a refractive index of the second medium being different from each other; a liquid crystal layer interposed between the first and the second substrates; and a backlight assembly positioned outside of the first substrate to provide light onto the first medium in a reflection mode.

In another aspect, the transflective type liquid crystal display device includes a first substrate having a pixel region, the pixel region including a transmission region and a reflection region, the first substrate having a light guiding layer formed thereon, a reflector being formed on the light guiding layer within the reflection region, the light guiding layer including a first medium and a second medium, a refractive index of the first medium and a refractive index of the second medium being different from each other; a second substrate, which faces the first substrate, and on which a color filter layer is formed; a liquid crystal layer interposed between the first and the second substrates; and a backlight assembly positioned outside of the first substrate to provide light onto the first medium in a transmission mode.

In another aspect, the method for manufacturing a transflective type liquid crystal display device includes depositing a first medium having a first refractive index on a substrate; forming a plurality of patterns on the substrate by etching the deposited first medium; forming a light guiding layer by depositing a second medium having a second refractive index between the plurality of patterns; and sequentially forming a color filter layer and a common electrode on the light guiding layer.

In another aspect, the method for manufacturing a transflective type liquid crystal display device includes depositing a first medium having a first refractive index on a substrate; forming a plurality of patterns on the substrate by etching the first medium; forming a light guiding layer by depositing a second medium having a second refractive index, between the plurality of patterns; forming a thin film transistor and a pixel electrode on the light guiding layer within a pixel region, the pixel region including a transmission region and a reflection region; and forming a reflector on the reflection region of the pixel region.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the present invention and together with the description serve to explain the principles of that invention. In the drawings.

DETAILED DESCRIPTION OF THE INVENTION

Reference will now be made in detail to the embodiments of the present invention, examples of which are illustrated in the accompanying drawings.

Figure 1:
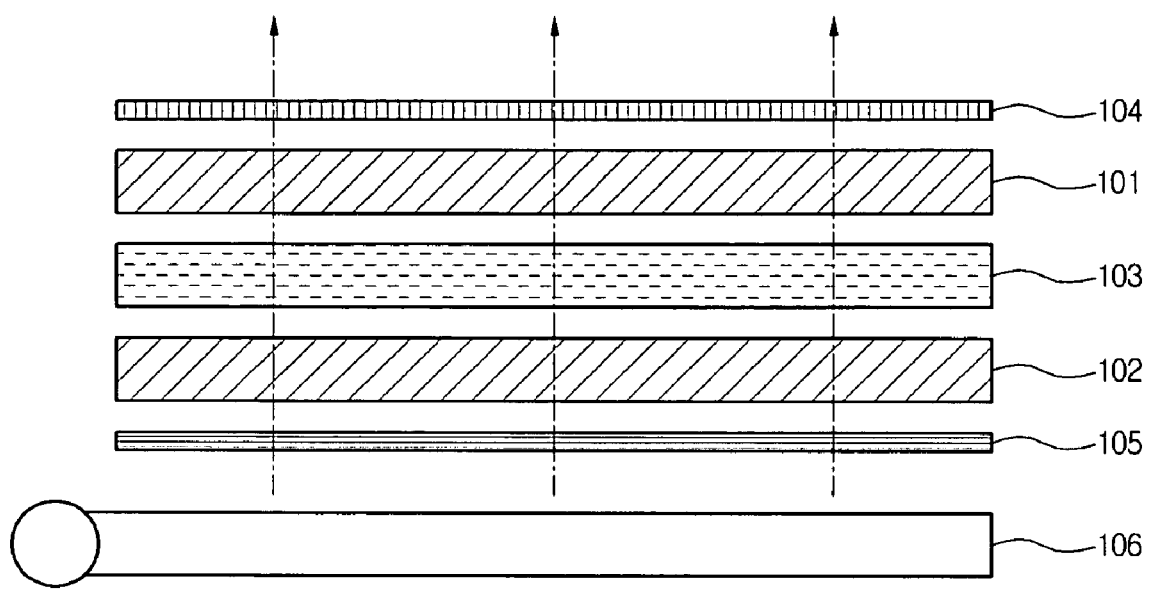
FIG. 1 is a cross-sectional view of a transmission type LCD device according to a related art.
Figure 2:
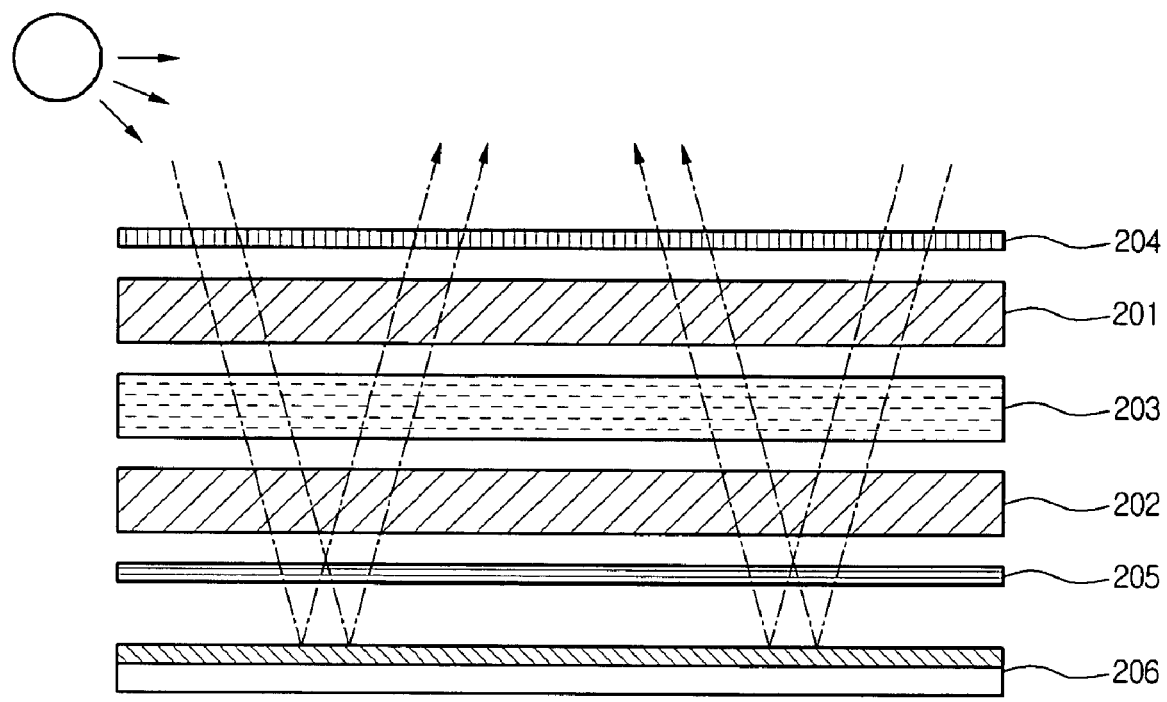
FIG. 2 is a cross-sectional view of a reflection type LCD device according to a related art.
Figure 3:
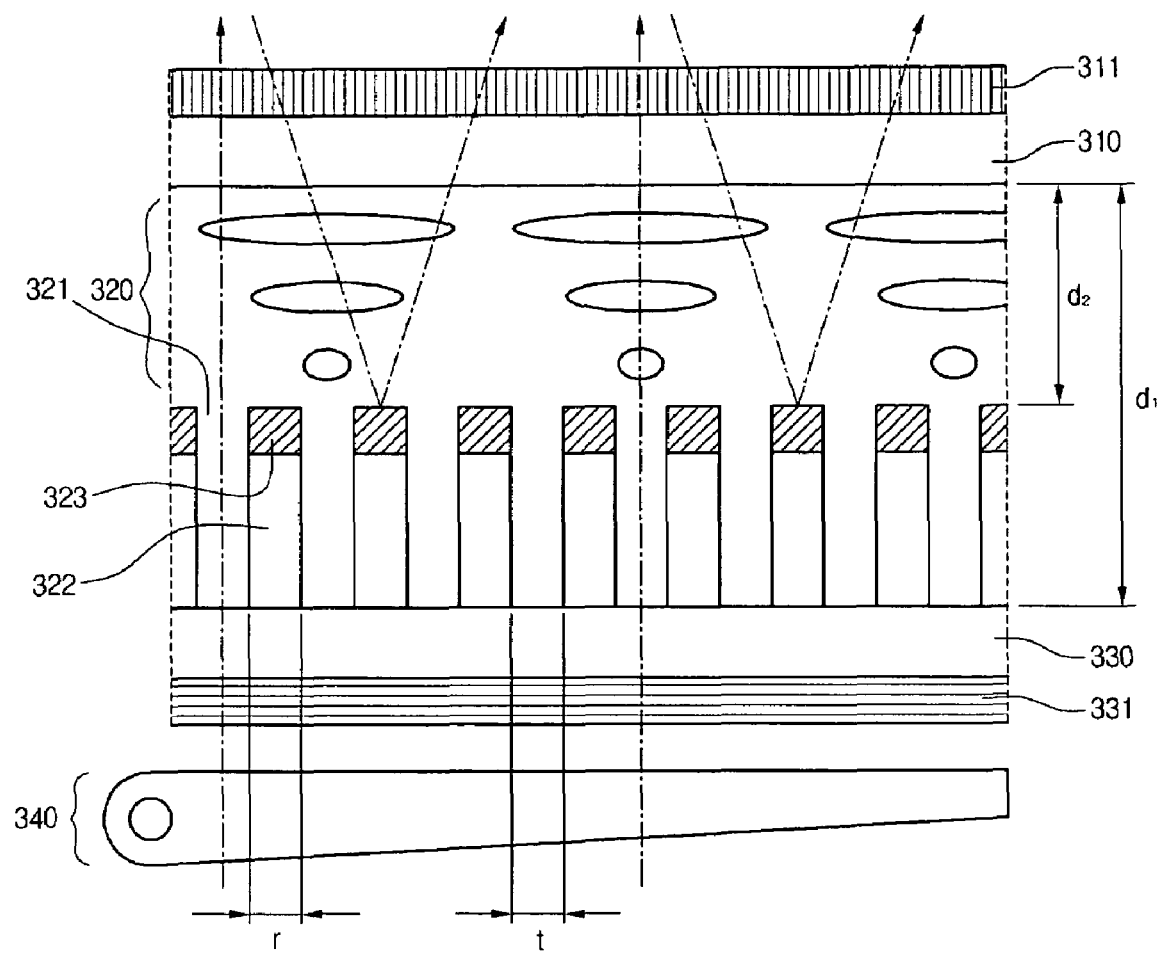
FIG. 3 is a cross-sectional view of a transflective type LCD device according to a related art.
Figure 4:
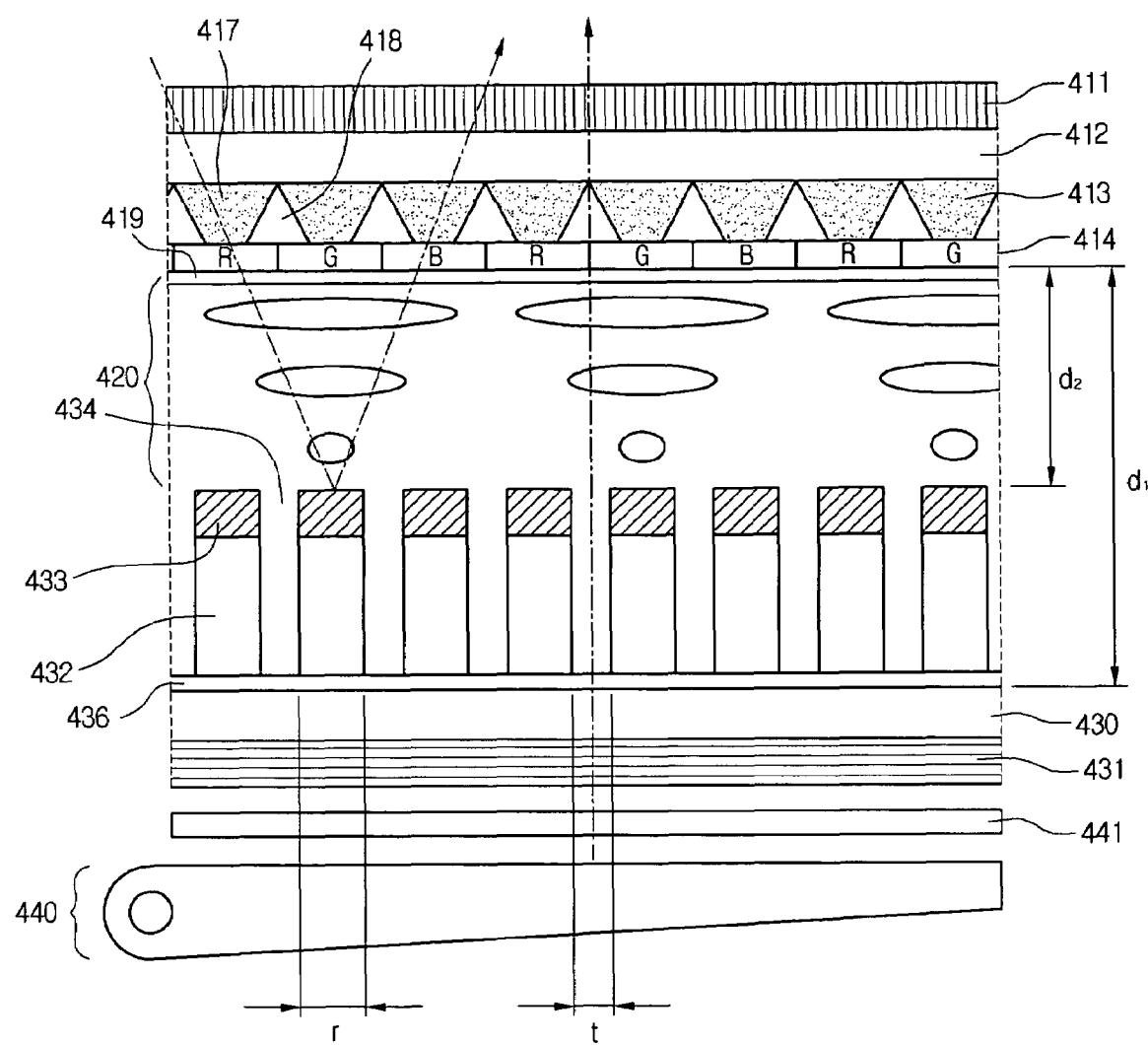
FIG. 4 is a cross-sectional view of an exemplary structure of a transflective type LCD device according to a first embodiment of the present invention.

FIG. 4 is a cross-sectional view of an exemplary structure of a transflective type LCD device according to a first embodiment of the present invention. Referring to FIG. 4, the transflective type LCD device includes a first substrate 430 and a second substrate 412. A plurality of gate lines and a plurality of data lines (not shown) define a pixel region on the first substrate 430. A thin film transistor, TFT, (not shown) is connected to a gate line and a data line, and a pixel electrode 436 is connected to a drain electrode of the TFT. Accordingly, the pixel region may include the TFT and the pixel electrode 436.

The second substrate 412 faces the first substrate 430. A reflector 433 is formed on the first substrate 430, with a pixel electrode 436 formed below the reflector 433. The reflector 433 partitions the pixel region into a reflection region 'r' and a transmission region 't'. A light guiding layer 413 and a color filter layer 414 are formed on the second substrate. A common electrode 419, to which a common voltage is applied, may be formed on the color filter layer 414. The light guiding layer 413 includes first and second media 417 and 418 having different refractive indexes. A liquid crystal layer 420 including liquid crystals is interposed between the first and the second substrates 430 and 412. First and the second polarizing plates 431 and 411 are arranged on a lower surface of the first substrate 430 and an upper surface of the second substrate 412, respectively. An optical transmission axis of the first polarizing plate 431 has an angle of 90° with respect to an optical transmission axis of the second polarizing plate 411.

The transflective type LCD device further includes a backlight assembly 440 disposed outside the first polarizing plate 431. A collimator 441 is disposed between the first polarizing plate 431 and the backlight assembly 440. The collimator 441 modulates an incident angle of light emitted from the backlight assembly 440 such that a light incident onto the first substrate 430 is parallel.

As discussed above, the pixel region can be divided into a reflection region 'r' and a transmission region 't'. A transmission hole 434 exposes the transmission region 't' of the pixel electrode 436. The passivation layer 432 and the reflector 433 thereon are disposed on the reflection region 'r' excluding the exposed transmission region 't'. The transmission region 't' and the reflection region 'r' are alternately arranged on the pixel electrode 436. The reflection region 'r' is the region where ambient light is reflected in a reflection mode, and the transmission region 't' is the region where light emitted from the backlight assembly 440 is transmitted in a transmission mode. A cell gap d1 in the transmission region 't' may be about twice as much as a cell gap d2 in the reflection region 'r' to reduce a difference in a light propagation distance between the transmission region 't' and the reflection region 'r'.

As discussed above, the light guiding layer 413, which includes first and second media 417 and 418 having different refractive indexes, is formed on the second substrate 412. The first medium 417 and the second medium 418 are alternately arranged in the light guiding layer 413. The first medium 417 has a first refractive index na. The second medium 418 has a second refractive index nb smaller than the first refractive index na. A color filter layer 414 is formed on the light guiding layer 413. Here, a red sub-color filter R, a green sub-color filter G, and a blue sub-color filter B may be sequentially arranged in a unit pixel region of the color filter layer 414.

The light guiding layer 413 may be formed by an etching process. In other words, after the first medium 417 is formed on the second substrate 412, the first medium 417 is etched to form a predetermined 'V' shaped pattern by tapering a width of the first medium 417 toward its inside. After the 'V' shaped pattern is formed through the etching process, the second medium 418 is formed by a coating process to complete the manufacturing of the light guiding layer 413.

Here, the first refractive index na of the first medium 417 should be greater than the second refractive index nb of the second medium 418. As described above, in the reflection mode of operation, when the first refractive index na of the first medium 417 is greater than the second refractive index nb of the second medium 418, externally provided ambient light propagates through the first medium 417 toward the reflector 433. The ambient light incident into the reflector 433 is reflected by the reflector 433 back toward the first medium 417, and propagates again through the first medium 417. Thus, in the reflection mode of operation, the light guiding layer 413 guides all ambient light to the reflector 433 provided on the reflection region 'r' without light loss, thereby possibly reflecting more ambient light using the reflector 433 and improving light reflectivity.

In the transmission mode, light emitted from the backlight assembly 440 propagates through the transmission region 't' of the first substrate and is incident onto the second medium 418. Since the second refractive index nb of the second medium 418 is smaller than the first refractive index na of the first medium 417, the incident light has a transmission angle greater than its incident angle and propagates through the first medium 417 out of the LCD device.

Figure 5:
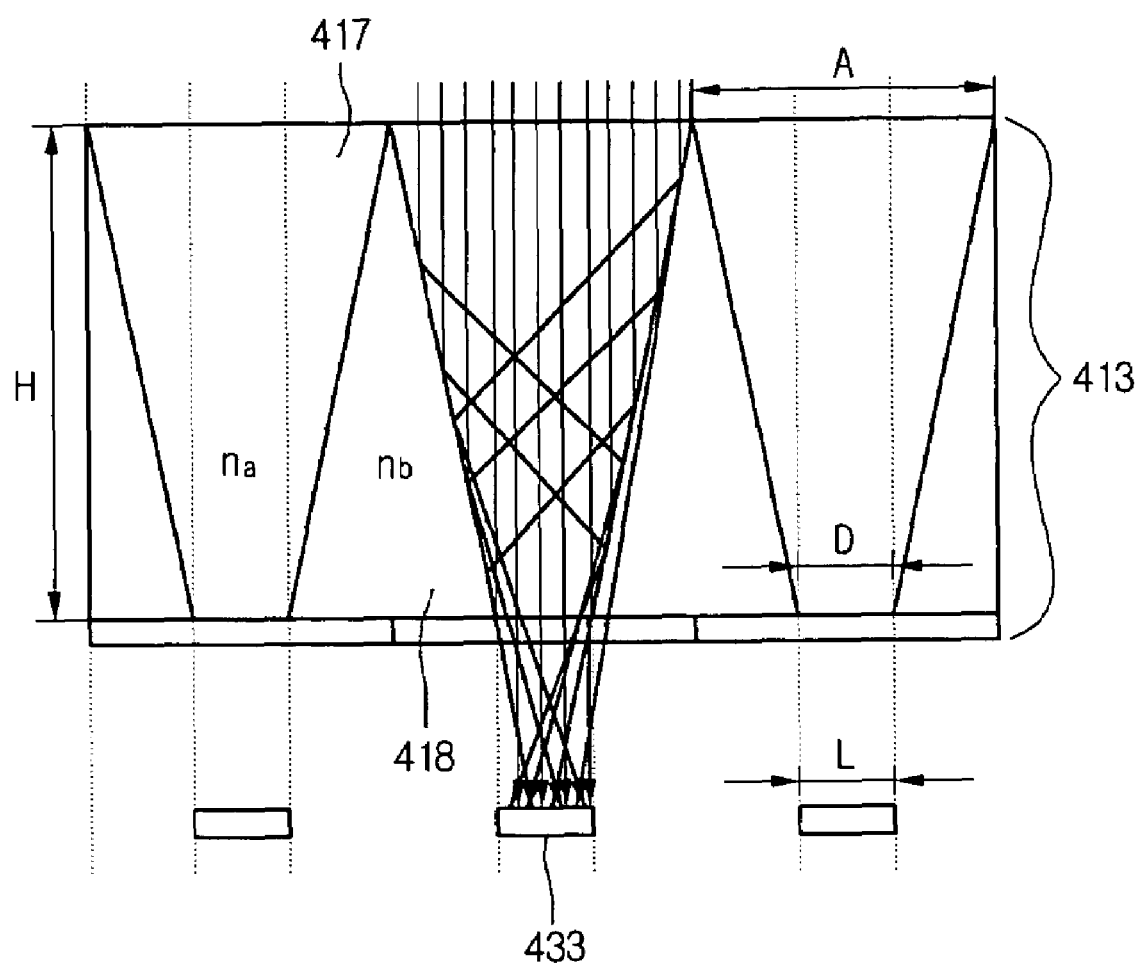
FIG. 5 is a schematic view of light propagation through an exemplary light guiding layer in a reflection mode in accordance with an embodiment of the present invention.

FIG. 5 is a schematic view of light propagation through an exemplary light guiding layer in a reflection mode in accordance with an embodiment of the present invention. Referring to FIG. 5, the light guiding layer 413 includes the first and the second media 417 and 418, which are alternately arranged to form a 'V' shape pattern. When the first refractive index na of the first medium 417 is greater than the second refractive index nb of the second medium 418, ambient light can be totally internally-reflected and propagate through the first medium 417 without light loss to the surroundings.

A width A of an incident side of the first medium 417, upon which ambient light is incident, is the same as a pitch of the pixel region. A width L of the reflector 433 should be greater than a width D of an exiting side of the first medium 417, from which light emerges toward the reflector 433 (L≧D). Also, the thickness H of the light guiding layer 413 should be greater than the width A in the incident side of the first medium 417. With such a structure of the light guiding layer 413, both the light reflectivity and the light transmittance can be improved.

Figure 6A:
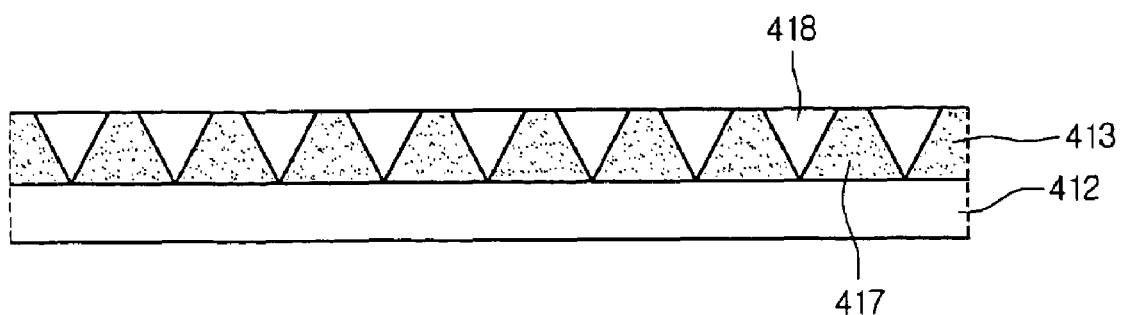
FIG. 6A is a sectional view illustrating an exemplary method for forming 'V' shaped patterns while manufacturing a transflective type LCD device according to the first embodiment of the present invention.

FIG. 6A is a sectional view illustrating an exemplary method for forming 'V' shaped patterns while manufacturing a transflective type LCD device according to the first embodiment of the present invention. As shown in FIG. 6A, a first medium 417, which has a first refractive index na, is deposited on a substrate 412 and patterned into a plurality of 'V' shaped portions. Then, a second medium 418, which has the second refractive index nb, is deposited on a dented portion between the 'V' shaped portions of the first medium 417, thus forming a light guiding layer 413.

Specifically, the first medium 417 is deposited on the substrate 412. Thereafter, the deposited first medium 417 is etched such that it is tapered toward its inside, thereby forming the 'V' shaped pattern. Here, the 'V' shaped pattern includes a plurality of 'V' shaped portions. The etching process is performed such that a dented portion is formed between the 'V' shaped portions.

A variety of methods can be applied for the etching process. For example, in a photolithography process, a photoresist is coated on the first medium 417 to form a photoresist layer. Next, an exposure mask is positioned above the photoresist layer. Then, an exposure process is performed to expose a selected portion of the photoresist layer to light. The exposed photoresist layer is developed, thereby forming a patterned photoresist layer. Then, the first medium 417 is etched by using the patterned photoresist layer as a mask. Thereafter, the patterned photoresist layer is removed, thereby forming the first medium 417 having the 'V' shaped pattern on the substrate 412.

The second medium 418 is deposited on the dented portion between the 'V' shaped portions of the first medium 417, thereby forming a predetermined light guiding layer 413. When ambient light is incident on the light guiding layer 413, since the first refractive index na of the first medium 417 is greater than the second refractive index nb of the second medium 418 ($n_a > n_b$), total internal reflection occurs inside the first medium 417.

Figure 6B:
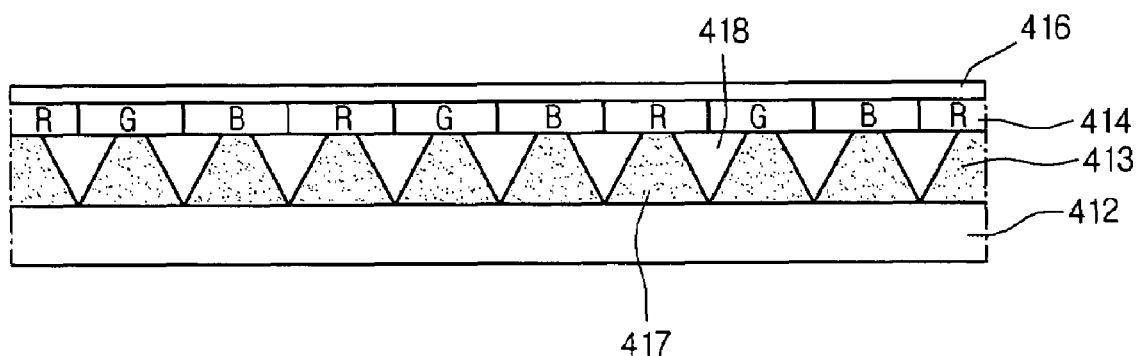
FIG. 6B is a sectional view illustrating an exemplary method for forming a color filter layer and a common electrode layer while manufacturing a transflective type LCD device according to the first embodiment of the present invention.

FIG. 6B is a sectional view illustrating an exemplary method for forming a color filter layer and a common electrode layer while manufacturing a transflective type LCD device according to the first embodiment of the present invention. Referring to FIG. 6B, a color filter layer 414 and a common electrode layer 416 are sequentially formed on the light guiding layer 413. Specifically, the color filter layer 414, which includes a red sub-color filter R, a green sub-color filter G, and a blue sub-color filter B, is formed on the light guiding layer 413. Then, the common electrode 416, which includes a transparent conductive material, is formed on the color filter layer 414. Due to such a structure, in which the color filter layer 414 is formed on the light guiding layer 413 over the substrate 412, the optical reflectance of the transflective type LCD device can be improved because all of the ambient light can be guided through the guiding layer 413 to be incident onto the reflector 433.

Figure 7:
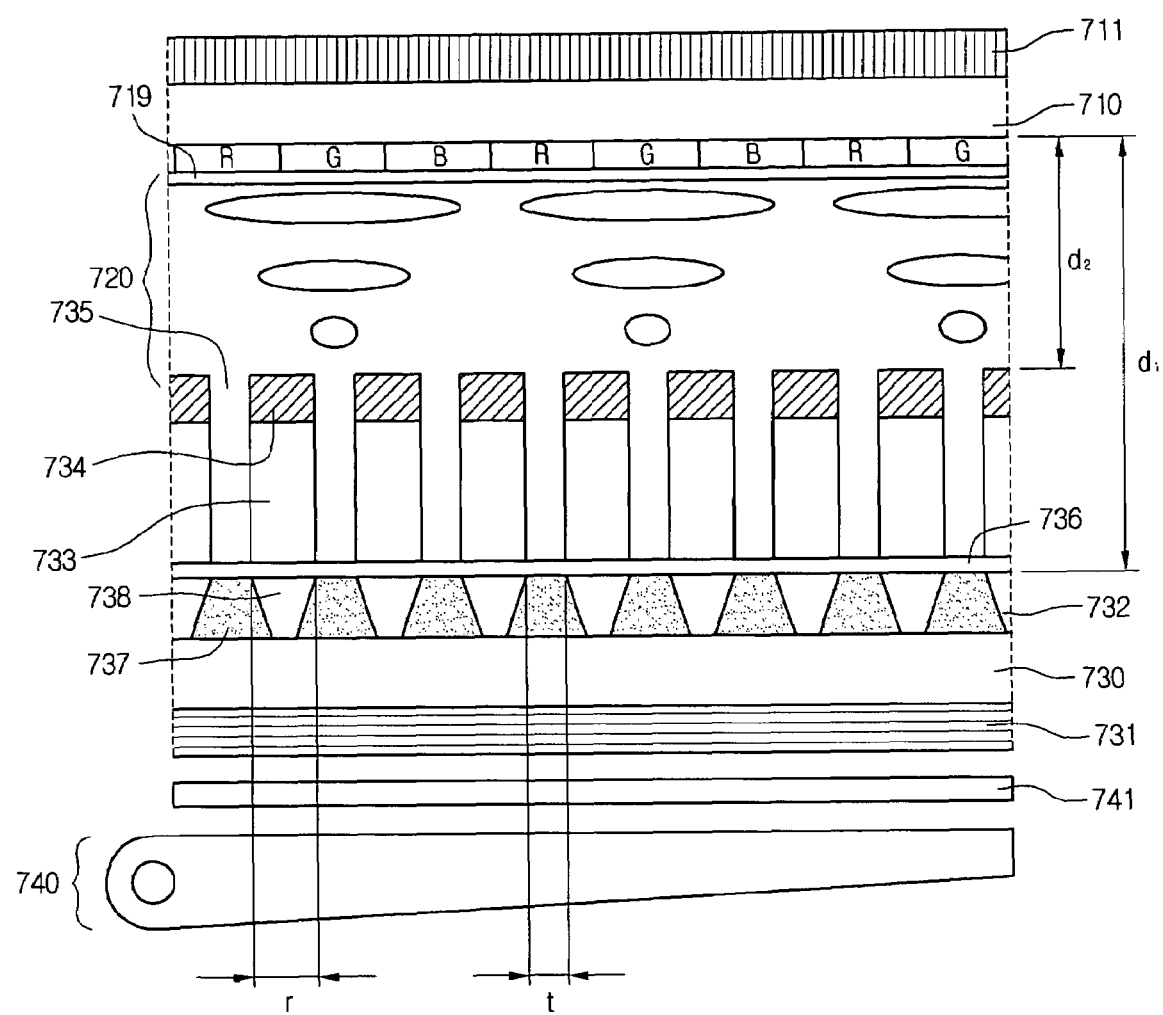
FIG. 7 is a cross-sectional view illustrating an exemplary method for manufacturing a transflective type LCD device according to a second embodiment of the present invention.

FIG. 7 is a cross-sectional view illustrating an exemplary method for manufacturing a transflective type LCD device according to a second embodiment of the present invention. Referring to FIG. 7, the transflective type LCD device includes a first substrate 730 and a second substrate 710. The second substrate 710 faces the first substrate 730. A color filter layer and a common electrode 719 are formed on the second substrate 710. A liquid crystal layer 720, which includes liquid crystals, is interposed between the first and the second substrates 730 and 710. A first polarizing plate 731 is arranged on a surface of the first substrate 730. A second polarizing plate 711 is arranged on a surface of the second substrate 710.

The transflective type LCD device further includes a backlight assembly 740 disposed outside the first polarizing plate 731. A collimator 741 is disposed between the first polarizing plate 731 and the backlight assembly 740. The collimator 741 modulates an incident angle of light emitted from the backlight assembly 740 such that a light incident onto the first substrate 730 is parallel.

A plurality of gate lines (not shown) and a plurality of data lines (not shown) form a pixel region on the first substrate 730. A light guiding layer 732, a pixel electrode 736, and a reflector 734 are formed on the first substrate 730 within the pixel region. The reflector 734 partitions the pixel region into a reflection region 'r' and a transmission region 't'. A transmission hole 735 exposes the transmission region 't' of the pixel electrode 736. A passivation layer 733 and the reflector 734 thereon are disposed on the reflection region 'r' excluding the exposed transmission region 't'. The transmission region 't' and the reflection region 'r' are alternately arranged on the pixel electrode 736. The reflection region 'r' is the region where ambient light is reflected in a reflection mode, and the transmission region 't' is the region where light emitted from the backlight assembly 740 is transmitted in a transmission mode. A cell gap d1 in the transmission region 't' may be about twice as wide as a cell gap d2 in the reflection region 'r' to reduce a difference in a light propagation distance between the transmission region 't' and the reflection region 'r'.

The embodiment of the invention depicted in FIG. 7 is similar to the embodiment depicted in FIG. 4. However, in the first embodiment of the present invention as depicted in FIG. 4, the light guiding layer 413 is formed on the second substrate 412, on which the color filter layer 414 is formed. In contrast, in the second embodiment of the present invention as depicted in FIG. 7, the light guiding layer 732 is formed on the first substrate 730. Therefore, the transflective LCD device embodied in FIG. 7 is designed to improve light transmittance in the transmission mode.

Referring to FIG. 7, the light guiding layer 732 includes first and second media 737 and 738. The first and second media 737 and 738 are formed by a series of process and have different refractive indexes. Refractive indexes of the first and the second media 737 and 738 are different from each other. The refractive index of the first medium 737 should be greater than the refractive index of the second medium 738. Also, the first medium 737 is tapered toward its inside. Accordingly, light transmitted from the backlight assembly 740 can propagate through the first medium 737, due to total internal reflection in the first medium in the transmission mode.

It is preferable that a width in the outgoing side of the first medium 737 is the same as a width of the transmission region. Thus, by making the width in the outgoing side of the first medium 737 to be equal to the width of the transmission region as described above, light propagated through the first medium 737 by total internal reflection can be provided onto the transmission region without loss. Thus, optical transmittance is improved by such a reduction in light loss. Also, since a width in the incident side of the first medium 737 is greater than the width in the outgoing side of the first medium 737, a much greater portion of the light transmitted from the backlight assembly 740 can be incident onto the first medium 737, thereby improving further the optical transmittance. Thus, in the transflective type LCD device having the above-described structure, optical transmittance is improved by the formation of the light guiding layer 732 on the substrate where the pixel region is defined, because light transmitted from the backlight assembly 740 in the transmission mode propagates without loss through the light guiding layer 732.

Figure 8A:
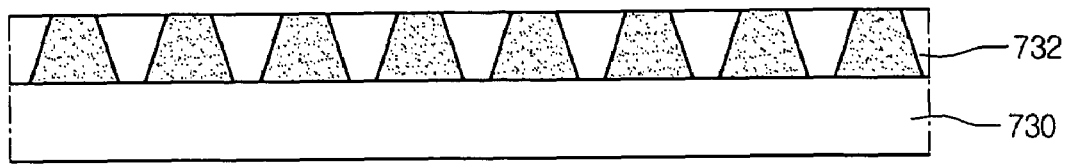
FIG. 8A is a sectional view illustrating an exemplary method for forming a light guiding layer for the transflective type LCD device according to the second embodiment of the present invention.

FIG. 8A is a sectional view illustrating an exemplary method for forming a light guiding layer for the transflective type LCD device according to the second embodiment of the present invention. Referring to FIG. 8A, a light guiding layer 732 is formed on the first substrate 730 by an etching process similar to the above-described etching process. The light guiding layer 732 includes a first medium having a first refractive index and a second medium having a second refractive index that is smaller than the first refractive index.

Figure 8B:
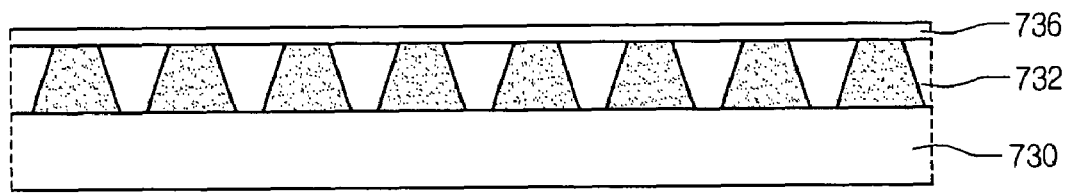
FIG. 8B is a sectional view illustrating an exemplary method for forming a metal layer for the transflective type LCD device according to the second embodiment of the present invention.

FIG. 8B is a sectional view illustrating an exemplary method for forming a metal layer for the transflective type LCD device according to the second embodiment of the present invention. As shown in FIG. 8B, a metal layer 736 is subsequently formed on the light guiding layer 732. The metal layer 736 can include a gate line, a data line, a thin film transistor, and a pixel electrode.

Figure 8C:
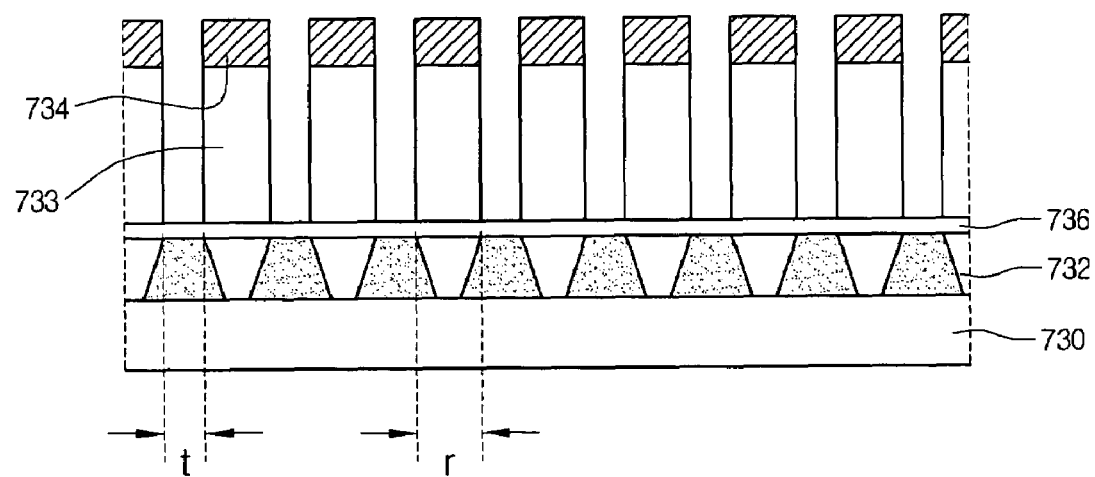
FIG. 8C is a sectional view illustrating an exemplary method for forming a reflection region for the transflective type LCD device according to the second embodiment of the present invention.

FIG. 8C is a sectional view illustrating an exemplary method for forming a reflection region for the transflective type LCD device according to the second embodiment of the present invention. As shown in FIG. 8C, a passivation layer 733 and a reflector 734 are sequentially deposited on the pixel electrode to form a reflection region 'r'. The deposited passivation layer 733 and the reflector 734 are patterned to form a transmission region 't' by exposing a portion of the pixel electrode.

As described above, in accordance with a first embodiment of the present invention, a light guiding layer is formed on a substrate where a color filter layer is formed such that ambient light is guided toward a reflection region lossless, thereby improving the light reflectivity. Also, in accordance with a second embodiment of the present invention, the light guiding layer is formed on the substrate where the pixel region is defined, so that light transmitted from the backlight assembly is guided to the transmission region lossless, thereby improving the optical transmittance. Accordingly, embodiments of the present invention maximize optical efficiency by increasing the optical reflectance and transmittance in the transflective type LCD device in the reflection and the transmittance modes, respectively. According to embodiments of the present invention, a maximum optical efficiency is achieved by forming a delta film inside the transflective type liquid crystal display device, and guiding light in the reflection mode or the transmission mode.

It will be apparent to those skilled in the art that various modifications and variations can be made in embodiments the present invention without departing from the spirit or scope of the invention. Thus, it is intended that the present invention cover the modifications and variations of this invention provided they come within the scope of the appended claims and their equivalents.

What is claimed is:

1. A transflective type liquid crystal display device, comprising:
    a first substrate having a pixel region, the pixel region including a transmission region and a reflection region that has a reflector formed thereon;
    a second substrate, which faces the first substrate, and on which a light guiding layer and a color filter layer are formed, the light guiding layer including a first medium and a second medium, a refractive index of the first medium and a refractive index of the second medium being different from each other;
    a liquid crystal layer interposed between the first and the second substrates; and
    a backlight assembly positioned outside of the first substrate to provide light onto the first medium in a reflection mode.

2. The transflective type liquid crystal display device according to claim 1, wherein first and second polarizing plates whose optical transmission axes are perpendicular to each other are arranged on outer surfaces of the first and the second substrates.

3. The transflective type liquid crystal display device according to claim 1, wherein a collimator is arranged between the first substrate and the backlight assembly, the collimator modulating a light emitted from the backlight assembly into a parallel light.

4. The transflective type liquid crystal display device according to claim 1, wherein a boundary between the first medium and the second medium is formed in a 'V' shape.

5. The transflective type liquid crystal display device according to claim 1, wherein the refractive index of the first medium is greater than the refractive index of the second medium.

6. The transflective type liquid crystal display device according to claim 1, wherein a width of an incident side of the first medium is greater than a width of an outgoing side of the first medium.

7. The transflective type liquid crystal display device according to claim 1, wherein a width of an incident side of the first medium is the same as a pitch of the pixel region.

8. The transflective type liquid crystal display device according to claim 1, wherein a width of the reflector is greater than a width of an outgoing side of the first medium.

9. The transflective type liquid crystal display device according to claim 1, wherein a thickness of the light guiding layer is greater than a width of an incident side of the first medium.

10. A method for manufacturing a transflective type liquid crystal display device, the method comprising:
    depositing a first medium having a first refractive index on a substrate;
    forming a plurality of patterns on the substrate by etching the deposited first medium;
    forming a light guiding layer by depositing a second medium having a second refractive index between the plurality of patterns; and
    sequentially forming a color filter layer and a common electrode on the light guiding layer.

11. The method according to claim 10, wherein the plurality of patterns are formed in a 'V' shape tapered toward an inside of the first medium.

12. The method according to claim 10, wherein the first refractive index is greater than the second refractive index.

* * * * *